United States Patent
Kise et al.

(10) Patent No.: US 11,953,047 B2
(45) Date of Patent: Apr. 9, 2024

(54) FORMED BODY OF Cu—Al—Mn-BASED SHAPE-MEMORY ALLOY AND METHOD FOR PRODUCING SAME

(71) Applicant: FURUKAWA TECHNO MATERIAL CO., LTD., Hiratsuka (JP)

(72) Inventors: Sumio Kise, Hiratsuka (JP); Toyonobu Tanaka, Hiratsuka (JP); Kenji Uruma, Hiratsuka (JP); Kouji Ishikawa, Hiratsuka (JP); Nanami Kataoka, Osaka (JP); Shigekazu Yokoyama, Osaka (JP); Toyohiko Higashida, Osaka (JP); Yoshitaka Azuma, Osaka (JP)

(73) Assignee: FURUKAWA TECHNO MATERIAL CO., LTD., Hiratsuka (JP)

( * ) Notice: Subject to any disclaimer, the term of this patent is extended or adjusted under 35 U.S.C. 154(b) by 364 days.

(21) Appl. No.: 17/421,171

(22) PCT Filed: Jan. 27, 2020

(86) PCT No.: PCT/JP2020/002834
§ 371 (c)(1),
(2) Date: Jul. 7, 2021

(87) PCT Pub. No.: WO2020/158684
PCT Pub. Date: Aug. 6, 2020

(65) Prior Publication Data
US 2022/0120308 A1    Apr. 21, 2022

(30) Foreign Application Priority Data

Jan. 31, 2019   (JP) ................................ 2019-016373

(51) Int. Cl.
*F16B 35/00*   (2006.01)
*B21H 3/02*   (2006.01)
(Continued)

(52) U.S. Cl.
CPC ............... *F16B 35/00* (2013.01); *B21H 3/02* (2013.01); *C22C 9/05* (2013.01); *C22F 1/08* (2013.01)

(58) Field of Classification Search
CPC .. F16B 35/00; B21H 3/02; C22C 9/00; C22C 9/01; C22C 9/05; C22F 1/00; C22F 1/08
(Continued)

(56) References Cited

U.S. PATENT DOCUMENTS 4,348,141 A    9/1982  Dahl
6,494,657 B2 *  12/2002  Unsworth ........... F16B 25/0031
                                                    411/16

(Continued)

FOREIGN PATENT DOCUMENTS

CN    109136805 A    1/2019
EP    2 578 707 A1   4/2013
(Continued)

OTHER PUBLICATIONS

Office Action dated Aug. 3, 2021 in corresponding Japanese Patent Application No. 2019-016373 (with English Translation), 5 pages.
(Continued)

*Primary Examiner* — Roberta S Delisle
(74) *Attorney, Agent, or Firm* — Oblon, McClelland, Maier & Neustadt, L.L.P.

(57) ABSTRACT

A formed body of Cu—Al—Mn-based shape-memory alloy may include a screw portion, wherein the screw portion is a form-rolled portion. A method for producing a formed body of Cu—Al—Mn-based shape-memory alloy may involve forming a screw portion having superelasticity by plastically working at least a portion of a material for the formed body with form-rolling in a state that a crystal structure is an A2-type structure and then, subjecting heat-treatment so as to convert the A2-type crystal structure into an $L_{21}$-type
(Continued)

crystal structure. The screw portion can be formed with good working property, and has excellent fatigue resistance and breaking resistance.

18 Claims, 4 Drawing Sheets

(51) Int. Cl.
*C22C 9/05* (2006.01)
*C22F 1/08* (2006.01)

(58) Field of Classification Search
USPC .......................................... 411/411; 420/469
See application file for complete search history.

(56) References Cited

U.S. PATENT DOCUMENTS

| 7,338,243 | B2* | 3/2008 | Gerhard | ............... F16B 35/041 |
| | | | | 411/311 |
| 11,118,255 | B2* | 9/2021 | Fujii | ......................... C22F 1/08 |
| 2013/0087074 | A1 | 4/2013 | Araki et al. | |
| 2015/0225826 | A1* | 8/2015 | Omori | ....................... C22F 1/08 |
| | | | | 148/435 |
| 2016/0060740 | A1* | 3/2016 | Omori | ....................... C22C 9/05 |
| | | | | 148/563 |
| 2016/0376688 | A1* | 12/2016 | Fujii | .................... B22D 21/005 |
| | | | | 420/471 |
| 2016/0377107 | A1* | 12/2016 | Bingeser | ................. F16B 33/06 |
| | | | | 411/411 |

FOREIGN PATENT DOCUMENTS

| JP | 11-207525 A | 8/1999 |
| JP | 2000-17357 A | 1/2000 |
| JP | 2003-213388 A | 7/2003 |
| JP | 2004-9135 A | 1/2004 |
| JP | 2017-141491 A | 8/2017 |
| JP | 2018-119657 A | 8/2018 |
| KR | 10-2013-0012643 A | 2/2013 |

OTHER PUBLICATIONS

Extended European Search Report dated Oct. 5, 2022 in European Patent Application No. 20748500.4, 9 pages.
Sutou, Y., et al., "Characteristics of Cu—Al—Mn-based shape memory alloys and their applications", Materials Science, Elsevier, Amsterdam, NL. vol. 378, No. 1-2, Jul. 25, 2004 (Jul. 25, 2004), pp. 278-282, XP004597336.
Sutou, Y., et al., "Ductile Cu—Al—Mn based shape memory alloys: general properties and applications", Materials Science and Technology, vol. 24, Jan. 1, 2008 (Jan. 1, 2008), pp. 896-901, XP009174315.
International Search Report dated Apr. 14, 2020 in PCT/JP2020/002834 filed on Jan. 27, 2020, 3 pages.
Araki, Y. et al., "Shaking table tests of steel fram with superelastic Cu—Al—Mn SMA tension braces," Earthquake Engineering & Structural Dynamics, vol. 45, 2016, pp. 297-314.
Kise, S. et al., "Mechanical splicing of superelastic Cu—Al—Mn alloy bars with headed ends," Smart Materials and Structures, vol. 27, 065025, 2018, pp. 1-11, 12 total pages.
Combined Chinese Office Action and Search Report dated Dec. 1, 2021 in Chinese Patent Application No. 202080005681.4 (with English translation), 15 pages.

* cited by examiner

FORMED BODY OF Cu—Al—Mn-BASED SHAPE-MEMORY ALLOY AND METHOD FOR PRODUCING SAME

CROSS-REFERENCE TO RELATED APPLICATIONS

The present application is the national stage of international application PCT/JP2020/002834, filed on Jan. 27, 2020, and claims the benefit of the filing date of Japanese Appl. No. 2019-016373, filed on Jan. 31, 2019, the content of each of which is incorporated by reference.

TECHNICAL FIELD

The present invention relates to a formed body of Cu—Al—Mn-based shape-memory alloy and a method of manufacturing the same. More specifically, the present invention relates to a formed body of Cu—Al—Mn-based shape-memory alloy having a screw portion formed with high working property and having high resistance to fatigue and relates to a method of manufacturing such a product.

BACKGROUND ART

A shape-memory alloy is a metallic material that can return to its pre-deformed shape when it undergoes temperature changes or removal of applied stress. The properties of a shape-memory alloy can be classified into two types: the property of returning to its pre-deformed shape when it is heated after being deformed (this property is called "shape-memory effect"; and the property of returning to its pre-deformed shape when stress is removed after the stress is applied to give a strain exceeding the maximum elastic strain (this property is called "superelasticity").

Once plastically deformed by application of stress exceeding the elastic limit, a normal metallic material cannot return to its pre-deformed shape unless it is worked again. In contrast, a shape-memory alloy can behave as mentioned above due to its specific properties. As used herein, the term "shape-memory alloy" refers to an alloy having at least superelasticity among the shape-memory effect and superelasticity mentioned above.

Shape-memory alloys exhibit a significant level of shape-memory effect and superelasticity in association with superelastic martensitic reverse transformation and have excellent functions at living environment temperatures (ranges). Such shape-memory alloys have been put to practical use in various fields.

Products for application of the shape-memory effect of Ni—Ti-based alloys, which are typical shape-memory alloys, include, for example, combination taps and temperature control mechanisms in water heaters. Products for application of the superelasticity of Ni—Ti-based alloys include, for example, brassiere wires, core materials for cellular phone antennas, frames for eyeglasses, and materials for recent use in medical guide wires and stents.

In recent years, damping members for improving the seismic capacity of buildings and other structures have been developed using general steel materials, extremely low yield point steel, etc. Such damping members are designed to use plastic deformation of metal to absorb seismic energy so that main structures will not suffer from damage. If a shape-memory alloy having superelasticity as mentioned above is used to form a damping member in which only a portion made of the shape-memory alloy can plastically deform, the resulting damping member will have the property of returning to its original state from a deformed state without heating, because the shape-memory can return to its original shape at a temperature (transformation temperature) sufficiently lower than ordinary temperature. Therefore, such a shape-memory alloy-based damping member will undergo no or very little residual deformation even after it suffers a massive earthquake, which will eliminate the need to replace the member with new one.

Such a damping member does not need to be entirely made of a relatively expensive shape-memory alloy and may be satisfactory if it is partially made of a shape-memory alloy. To make such a damping member satisfactory, a joint structure is necessary between the shape-memory alloy and other components such as steel members.

The properties of existing Ni—Ti-based shape-memory alloys are derived from cold-worked structures and recrystallization by heat treatment. In general, therefore, a mechanical joining method is used for joining to the shape-memory alloy, because, if welding is used for joining, the alloy will be further heated so that it can easily undergo structural change-induced property degradation or oxidation-induced embrittlement.

Typical examples of such a mechanical joining method include rivet joining, swage joining, bolt joining, shrink fitting, etc. Among them, bolt joining is typical simple means for producing strong joining forces.

For bolt joining, threads need to be formed on the target structural member. Examples of methods for forming such threads usually include cutting work methods and form rolling methods. Unfortunately, Ni—Ti-based shape-memory alloys are hardly cuttable and difficult to cut to form threads. In a low-temperature, martensitic phase state, shape-memory alloys are apparently deformable plastically. However, when heated to a temperature higher than the reverse transformation temperature, shape-memory alloys will have the shape-memory effect to return to the originally memorized shape and have the superelasticity to return to the original shape upon unloading even when they have been deformed. When having a martensitic phase, shape-memory alloys capable of being form-rolled may be subjected to apparent plastic deformation for shape-memory properties. When heated to a temperature higher than the reverse transformation temperature, however, such plastically deformed alloys will be deformed to have low thread accuracy. Superelasticity is the property of recovering plastic deformation. Therefore, a process of removing the worked structure by tempering to make possible plastic deformation in the final step tends to make it impossible to provide a sufficient level of superelasticity. For mechanical joining of Ni—Ti-based shape-memory alloy members, it is not practical to use bolts with rolled threads or plastically worked rivets, and swaging methods are often used practically.

Cu—Al—Mn-based shape-memory alloys also have shape-memory properties and superelasticity after undergoing structural control and aging heat treatment. Proposed methods for joining Cu—Al—Mn-based shape-memory alloy members include joining with bolts worked by cutting (Non-Patent Document 1), joining with rivets worked with a hot header (Non-Patent Document 2), and fitting methods such as shrink fitting (Patent Document 1), because Cu—Al—Mn shape-memory alloys are produced by methods different from those for Ni—Ti-based shape-memory alloys mentioned above and have good workability.

PRIOR ART DOCUMENT

[Patent Document 1] Japanese Unexamined Patent Application, Publication No. 2018-119657
[Non-Patent Document 1] Earthquake Engineering & Structural Dynamics 2016:45:297-314
[Non-Patent Document 2] Smart Materials and Structures 27:2018, 065025

DISCLOSURE OF THE INVENTION

Problems to be Solved by the Invention

However, working with a hot header to form rivets has problems such as the need for a special structure control for strengthening and the need for special manufacturing equipment. Fitting methods such as shrink fitting also need special equipment and have problems with reliability and cost due to unstable strength reliability. Moreover, threading by cutting provides low material yield and takes time, even for NC cutting, at least several times longer than that for general form rolling. In cutting machining of a material with uniform strength, there will be a risk of breakage of a screw portion, if the thread diameter, specifically, the diameter at the thread bottom, is larger than the rod diameter (the diameter of a portion (rod portion) other than the threads), and therefore, the thread diameter needs to be larger than the rod diameter, which leads to problems such as very low productivity and very low material yield.

It is therefore an object of the present invention to provide a shape-memory alloy joint structure formed with high working property and having high resistance to fatigue and high resistance to breaking, and in particular, to provide a formed body of Cu—Al—Mn-based shape-memory alloy having a screw portion with high resistance to fatigue and high resistance to breaking and to provide a method of manufacturing such a formed body.

Means for Solving the Problems

Figure 1A:
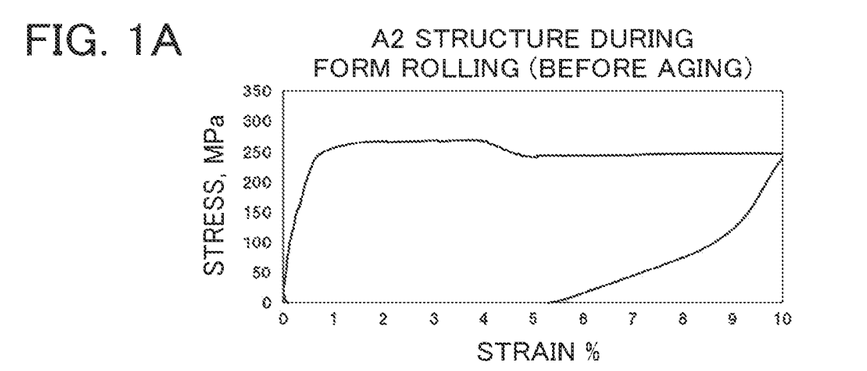
FIG. 1 is a graph showing the mechanical properties of a Cu—Al—Mn alloy, in which part (a) shows the mechanical properties of the alloy having the A2-type crystal structure formed by structure-controlling heat treatment, and part (b) shows the mechanical properties of the alloy having the $L2_1$-type crystal structure formed by aging heat treatment.
Figure 1B:
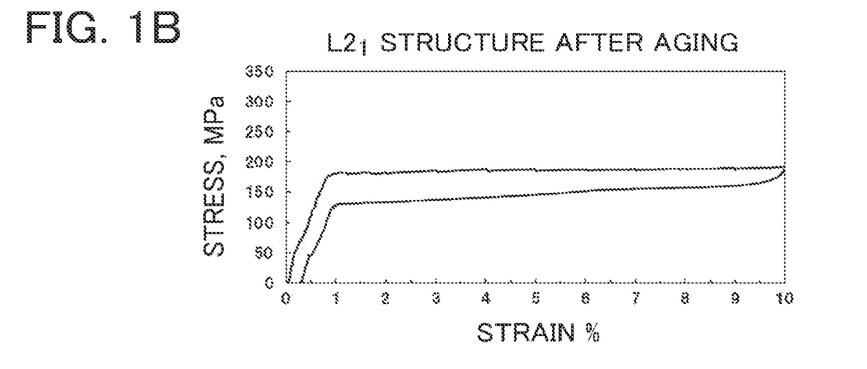

As a result of extensive studies to solve the problems described above, the present inventors have made the findings shown blow. Copper-based shape-memory alloys (Cu—Al—Mn-based alloys) have shape-memory properties after undergoing structure control heat treatment and aging heat treatment. In detail, after structure control heat treatment, the crystal has an A2-type structure (unordered structure), which gradually changes to an ordered structure to increase the transformation temperature when allowed to stand at room temperature, and therefore, in order to fix the transformation temperature, the crystal structure needs to be converted to an ordered $L2_1$-type crystal structure (full Heusler alloy) by aging heat treatment. For example, these states have the mechanical properties shown in parts (a) and (b) of FIG. 1. Part (a) of FIG. 1 indicates that the unordered A2-type structure, which does not have a sufficient level of superelasticity, can be plastically worked. The present inventors have found that, based on the above properties, superelastic threads can be formed by form rolling when the A2-type structure is subjected to form rolling and then subjected to aging heat treatment for converting the crystal structure to the $L2_1$-type structure. In arriving at the present invention, the present inventors have also found that a screw portion formed by such a process has a surface layer with high hardness in a region with at least a certain depth from its surface due to the application of compressive residual stress and that such a screw portion has high resistance to fatigue and high resistance to breaking.

Specifically, the gist of the present invention relates to the following aspects.

(1) A formed body of Cu—Al—Mn-based shape-memory alloy comprising a screw portion, wherein the screw portion is a form-rolled portion.

(2) The formed body of Cu—Al—Mn-based shape-memory alloy according to aspect (1), wherein the screw portion has an Hs/Ho ratio of 1.1 or more when measured in a cross section including an axis of the screw portion for Hs and Ho, wherein Hs is an average Vickers hardness of a surface layer portion of the screw portion, and Ho is an average Vickers hardness of a central portion of the screw portion.

(3) A formed body of Cu—Al—Mn-based shape-memory alloy comprising a screw portion, wherein the screw portion has an Hs/Ho ratio of 1.1 or more when measured in a cross section including an axis of the screw portion for Hs and Ho, wherein Hs is an average Vickers hardness of a surface layer portion of the screw portion, and Ho is an average Vickers hardness of a central portion of the screw portion.

(4) The formed body of Cu—Al—Mn-based shape-memory alloy according to aspect (1), (2), or (3), wherein the formed body comprises a rod portion extending from at least one end of the screw portion, and has a Dmax/Dsh ratio of 1.17 or less, wherein Dmax is a maximum diameter of the screw portion, and Dsh is a diameter of the rod portion.

(5) The formed body of Cu—Al—Mn-based shape-memory alloy according to aspect (4), wherein the formed body has a Dmin/Dsh ratio of 0.9 or more, wherein Dmin is a minimum diameter of the screw portion, and Dsh is the diameter of the rod portion.

(6) The formed body of Cu—Al—Mn-based shape-memory alloy according to any one of aspects (1) to (5), wherein the Cu—Al—Mn-based shape-memory alloy has a composition comprising 3.0 to 10.0 mass % of Al, 5.0 to 20.0 mass % of Mn, with the balance being Cu and inevitable impurities, and one or two or more optional additive elements selected from the group consisting of Ni, Co, Fe, Ti, V, Cr, Si, Nb, Mo, W, Sn, Mg, P, Be, Sb, Cd, As, Zr, Zn, B, C, Ag, and a misch metal, and the optional additive elements have a total content of 0.000 to 10.000 mass %.

(7) The formed body of Cu—Al—Mn-based shape-memory alloy according to any one of aspects (1) to (6), wherein the Cu—Al—Mn-based shape-memory alloy has an $L2_1$-type crystal structure.

(8) The formed body of Cu—Al—Mn-based shape-memory alloy according to any one of aspects (1) to (7), wherein the formed body has a characteristic not to break when undergoing a tensile cycle test including 1,000 cycles that repeats loading with a tensile strain of 5% and unloading.

(9) The formed body of Cu—Al—Mn-based shape-memory alloy according to any one of aspects (1) to (8), wherein the formed body has a breaking elongation of 7% or more until breaking by tensioning in a tensile test.

(10) A method of manufacturing a formed body of Cu—Al—Mn-based shape-memory alloy comprising a screw portion, wherein the method comprises: a step forming a screw portion having superelasticity by plastically working at least a portion of a raw material for the formed body with form-rolling in a state that a crystal structure is an A2-type structure and then, subjecting heat-treatment so as to convert the A2-type crystal structure into an $L2_1$-type crystal structure.

(11) The method according to aspect (10), wherein the heat-treatment is performed at a temperature in a range of 80° C. to 300° C.

Effects of the Invention

The present invention makes it possible to provide a Formed body of Cu—Al—Mn-based shape-memory alloy having a screw portion formed with high working property and having high resistance to fatigue and high resistance to breaking, for example, which is suitable for use as a structural member for damping parts for improving the seismic capacity of buildings and other structures.

PREFERRED MODE FOR CARRYING OUT THE INVENTION

Formed Body of Cu—Al—Mn-Based Shape-Memory Alloy

Next, a formed body of Cu—Al—Mn-based shape-memory alloy according to a preferred embodiment of the present invention will be described in detail below.

Naming for each portion will be described before the Cu—Al—Mn-based shape-memory alloy according to the present invention will be specifically described.

Naming for Screw Portion

Figure 2:
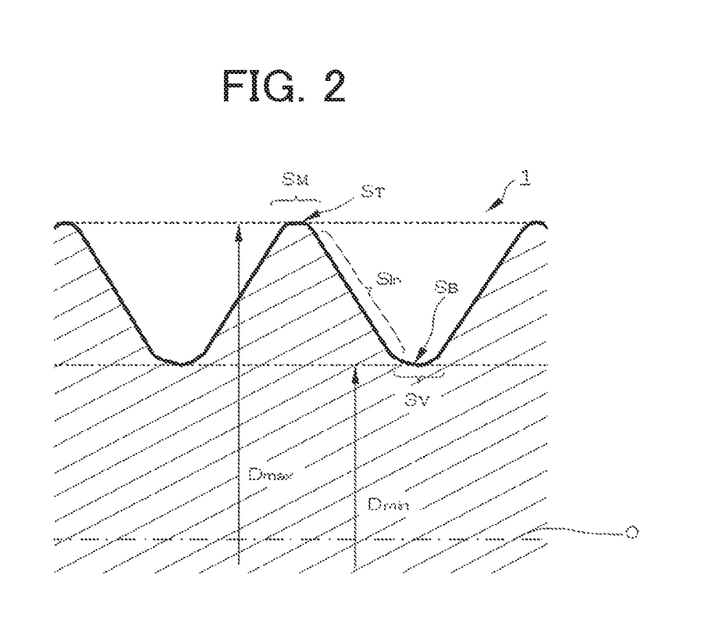
FIG. 2 is an enlarged cross-sectional view schematically showing each portion of a screw portion in a formed body.
Figure 3:
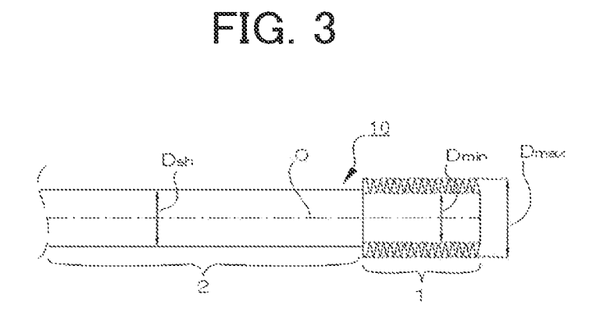
FIG. 3 is a view schematically showing an example of the shape of a formed body having a screw portion according to the present invention.

Naming for the screw portion will be described with reference to FIG. 2, which is an enlarged cross-sectional view showing a screw, and FIG. 3, which shows an example of a formed body having a screw portion according to the present invention. The term "screw portion" refers to a portion that is threaded in a formed body. In FIG. 3, reference numeral 1 represents the screw portion. The term "rod portion" refers to a portion that is not threaded and extends from at least one end of the screw portion in the formed body, that is, a portion other than the screw portion. In FIG. 3, reference numeral 2 represents the rod portion. The term "maximum diameter of the screw portion" refers to the maximum diameter determined at the position of the top $S_T$ of a thread $S_M$ of a male screw. In FIGS. 2 and 3, Dmax represents the maximum diameter of the screw portion. In this regard, the term "top" ($S_T$) regarding the thread $S_M$ of the male screw refers to a position of the thread $S_M$, farthest from the axis O of the screw portion. The term "minimum diameter of the screw portion" refers to the diameter when measured at a position of the bottom $S_B$ of a groove $S_V$ in a male screw. In FIGS. 2 and 3, Dmin represents the minimum diameter of the screw portion. In this regard, the term "bottom" ($S_B$) regarding a groove $S_V$ of a male screw refers to a position of the groove $S_V$, closest to the axis O of the screw portion. The term "inclined portion (SI) of the screw portion" refers to a face connecting (joining) the top $S_T$ of a thread $S_M$ and the bottom $S_B$ of a groove $S_V$, which forms a flank. The term "diameter of the rod portion" refers to the diameter of an unthreaded portion in the formed body, in other words, the diameter of a portion (rod portion 2) other than the screw portion. In FIG. 3, Dsh represent the diameter of the rod portion. In this regard, hereinafter, "the diameter of the rod portion" may be abbreviated as "the rod diameter". The term "axis of the screw portion" refers to a center line passing through the axial center of the screw portion. In FIGS. 2 and 3, reference sign O represents the center line. The term "central portion of the screw portion" means that when viewing a cross section including the axis of the screw portion, it refers to a portion extending along the axis of the screw portion and having a width of 0.80 mm centered on the axis. The term "surface layer portion of the screw portion" refers to a region from the surface of the screw portion to a certain depth, specifically, a region from the surface to a depth of 0.8 mm, over a surface of the screw portion connecting all of the top $S_T$ of a thread $S_M$, the bottom $S_B$ of a groove $S_V$, and the inclined portion SI, of the screw portion shown in FIG. 2. In this regard, the specified range of the "surface layer portion" is merely an indicator for indicating that the screw portion according to the present invention has a specifically high hardness. Such an indicator neither indicates that there is an actual clear difference over the boundary between the surface layer region and the inner region nor indicates that the threaded region formed by form rolling and having higher hardness is limited to such a depth. Preferably, a deeper region, specifically, a region from the surface to a depth of about 1.20 mm can have higher hardness. It should be noted that, in FIG. 3, the threads and grooves of the screw portion 1 are drawn in an exaggerated way, and the distance between the threads or grooves is also exaggerated.

The present invention relates to a formed body of Cu—Al—Mn-based shape-memory alloy 10. The formed body 10 includes a screw portion 1 that includes a Cu—Al—Mn-based shape-memory alloy and has a form-rolled portion.

The formed body 10 having the screw portion 1 according to the present invention may be not particularly limited, and the screw portion 1 may be provided at any part of the formed body. For example, as shown in FIG. 3, the screw portion 1 is provided at one end or both ends of a rod-like formed body.

The Ratio of the Average Vickers Hardness Hs of a Surface Layer Portion of the Screw Portion to the Average Vickers Hardness Ho of a Central Portion of the Screw Portion In the formed body 10 according to the present invention, the screw portion 1 preferably has an Hs/Ho ratio of 1.1 or more, more preferably 1.2 or more, and even more preferably 1.3 or more, when measured in a cross section including an axis O of the screw portion 1 for Hs and Ho, in which Hs is the average Vickers hardness of a surface layer portion of the screw portion 1, and Ho is the average Vickers hardness of a central portion of the screw portion 1.

As described later, the screw portion 1 of the formed body 10 according to the present invention is typically formed by converting the crystal structure of a raw material including a Cu—Al—Mn-based shape-memory alloy for the formed body to the A2-type crystal structure, which is plastically workable, and then form-rolling the raw material. The screw portion 1 formed by such a process has a smooth surface and a higher hardness resulting from compressive residual stress applied by plastic deformation. Accordingly, the hardness of every part of the surface layer portion over the screw portion 1 is higher than the original hardness of the raw material.

Cyclic Strength and Breaking Elongation of Screw Portion

As mentioned above, the screw portion 1 of the formed body of Cu—Al—Mn-based shape-memory alloy 10 can be formed to have high strength. Thus, the formed body 1 preferably has an ability not to break when undergoing a tensile cycle test including 1,000 cycles of loading with a tensile strain of 5% and unloading. According to this feature, the formed body 10 has high resistance to fatigue and provides high reliability. The formed body of Cu—Al—Mn-based shape-memory alloy 10 also preferably has a breaking elongation of 7% or more, more preferably 15% or more, and even more preferably 20% or more, when pulled to break in a tensile test. According to this feature, the formed body 10 has high resistance to breaking.

The Ratio of the Diameter of the Screw Portion to the Diameter of the Rod Portion In another aspect of the present invention, the formed body of Cu—Al—Mn-based shape-memory alloy 10 may further include a rod portion 2 extending at least one end of the screw portion 1 and preferably has a Dmax/Dsh ratio of 1.17 or less, in which Dmax is the maximum diameter of the screw portion 1, and Dsh is the diameter of the rod portion 2. According to the present invention, the formed body 10 having the screw portion 1 satisfying such a Dmax/Dsh ratio, which is formed by form rolling, has a satisfactory level of strength. For example, a screw portion, which is formed by cutting and satisfying a Dmax/Dsh ratio of 1.17 or less, fails to have a satisfactory level of strength. In terms of strength, therefore, the formed body having the screw portion formed by form rolling according to the present invention is clearly distinguishable from the formed body having a screw portion formed by cutting. The Dmax/Dsh ratio is more preferably 1.08 to 1.17 and even more preferably 1.10 to 1.14.

In a more preferred mode, the ratio (Dmin/Dsh) of the minimum diameter (Dmin) of the screw portion 1 to the diameter (Dsh) of the rod portion 2 is preferably 0.9 or more, more preferably 0.91 or more, and even more preferably 0.93 to 0.98.

Composition of Cu—Al—Mn-Based Alloy Material

The formed body 10 according to the present invention includes a Cu—Al—Mn-based shape-memory alloy material. The composition of the alloy material is preferably, but not limited to, as follows.

The copper-based alloy having shape-memory properties and superelasticity used in the present invention contains Al and Mn. This alloy has a β single phase (body-centered cubic) (hereinafter also simply referred to as "β single phase"), and has a two-phase structure including a β phase and an α phase (face-centered cubic) (hereinafter also simply referred to as "(α+β) phase") at low temperature. The high temperature at which the β single phase is produced is usually 700° C. or higher, and the low temperature at which the (α+β) phase is produced is approximately less than 700° C., although they depend on the composition of the alloy.

The Cu—Al—Mn-based shape memory alloy constituting the formed body according to the present invention, in case of the β single phase, is merely required that the crystal structure after the microstructure-controlled heat treatment shows an A2-type crystal structure and the crystal structure after the aging heat treatment exhibits an $L2_1$-type structure having a regular structure, but is not particularly limited.

Regarding the alloy composition, the Cu—Al—Mn-based alloy material used in the present invention preferably includes 3.0 to 10.0 mass % of Al, 5.0 to 20.0 mass % of Mn and the balance is Cu and inevitable impurities. If the Al content is too low, the β single phase may fail to be formed, and if the Al content is too high, the alloy material may be brittle. The Al content is more preferably 6.0 to 10.0 mass % although it varies with the Mn content. The alloy needs to contain Mn, because Mn allows the β phase range to spread to the low Al content side and can significantly increase the cold workability and facilitate shaping. If the Mn content is lower than 5.0 mass %, a satisfactory level of workability may fail to be obtained, and the β single phase region may fail to be formed. If the Mn content is higher than 20.0 mass %, a satisfactory level of shape recovery ability may fail to be obtained. The Mn content is more preferably 8.0 to 12.0 mass %.

Besides the above essential component elements, if necessary, the Cu—Al—Mn-based alloy material used in the present invention may contain, in a total amount of 0.000 to 10.000 mass %, one or more optional additive elements selected from the group consisting of Ni, Co, Fe, Ti, V, Cr, Si, Nb, Mo, W, Sn, Mg, P, Be, Sb, Cd, As, Zr, Zn, B, C, Ag, and a mish metal (e.g., Pr, Nd). These optional additive elements are effective in increasing the strength of the Cu—Al—Mn-based alloy material while maintaining the cold workability. The total content of these optional additive elements is preferably 0.000 to 10.000 mass % and more preferably 0.001 to 5.000 mass %. If the total content of these optional additive elements is more than 10.000 mass %, the martensitic transformation temperature may be low, which may make the β single phase structure unstable.

Ni, Co, Fe, and Sn are effective in strengthening the base (matrix) structure. Co can form a Co—Al intermetallic compound to increase the crystal grain size. Excess Co may decrease the toughness of the alloy. The Co content may be 0.001 to 2.000 mass %. Ni and Fe can form a Ni—Al intermetallic compound and an Fe—Al compound to decrease the Al concentration of the matrix, which may easily generate an irregular phase. Therefore, the content of each of Ni and Fe should be 0.001 to 6.000 mass %. If the matrix has a high Sn content, the alloy may have low toughness. Therefore, the Sn content should be 0.001 to 1.000 mass %.

Ti can increase the strength by combining with inhibitory elements N and O to form an oxynitride or through combined addition with B to form a boride. The Ti content may be 0.001 to 2.000 mass %.

V, Nb, Mo, and Zr are effective in increasing the hardness and increasing the wear resistance. These elements, which hardly form a solid solution in the matrix, can precipitate and form a β phase (bcc crystal) to increase the strength. The content of each of V, Nb, Mo, and Zr may be 0.001 to 1.000 mass %.

Cr is effective in maintaining the wear resistance and the corrosion resistance. The Cr content may be 0.001 to 2.000 mass %. Si is effective in increasing the corrosion resistance. The Si content may be 0.001 to 2.000 mass %. W, which hardly forms a solid solution in the matrix, is effective in enhancing the precipitation. The W content may be 0.001 to 1.000 mass %.

Mg is effective in removing inhibitory elements N and O and can fix S as a sulfide to effectively increase the hot workability and the toughness. Addition of a large amount of Mg may lead to grain boundary segregation, which may cause embrittlement. The Mg content may be 0.001 to 0.500 mass %.

P, which can act as a deoxidizing agent, is effective in increasing the toughness. The P content may be 0.01 to 0.50 mass %. Be, Sb, Cd, and As are effective in strengthening the matrix structure. The contents of each of Be, Sb, Cd, and As may be 0.001 to 1.000 mass %.

Zn is effective in raising the shape-memory treatment temperature. The Zn content may be 0.001 to 5.000 mass %. If used in an adequate amount, B and C can produce a pinning effect to effectively increase the crystal grain size. In particular, B and/or C is preferably added in combination with Ti and/or Zr. The content of each of B and C may be 0.001 to 0.500 mass %.

Ag is effective in improving the cold workability. The Ag content may be 0.001 to 2.000 mass %. If used in an adequate amount, misch metal can produce a pinning effect to effectively increase the crystal grain size. The misch metal content may be 0.001 to 5.000 mass %. The term "misch metal" refers to an alloy of a rare earth element, such as Pr, La, Ce, or Nd, which is difficult to separate in the form of an elementary substance.

The remainder other than the above components includes Cu and inevitable impurities. As used herein, the term "inevitable impurities" refers to impurities that may be inevitably introduced during the manufacturing process. Inevitable impurities include, for example, O, N, H, and S. For example, a total content of inevitable impurities of 0.10 mass % or less will not affect the properties of the Cu—Al—Mn-based alloy material according to the present invention.

The formed body 10 according to the present invention may have any of various specific shapes as long as it has a screw portion. Specific examples of the formed body include damping (vibration-damping) parts and building parts, such as general-purpose bolts, anchor bolts, brace screws, and deformed bars, which have surface irregularities for increasing the strength of bonding to cement or mortar. The formed body may also be used in fields particularly requiring resistance to cyclic deformation, such as space equipment, aircraft equipment, automobile members, electronic components, and other fields in which the conventional art is difficult to use. The formed body may also be any of various connecting members that can be used as civil engineering and construction parts to prevent noise or vibration pollution based on the property of absorbing vibration. To produce a noise attenuation effect, the formed body may also be any of various connecting members and structures in the field of transportation equipment.

As a non-limiting example, the formed body may be a damping member for buildings, which preferably has a diameter of 1.67 mm to 30.93 mm and includes a screw portion with M2 to M32 threads.

Method of Manufacturing Formed Body of Cu—Al—Mn-Based Shape-Memory Alloy

A method of manufacturing the formed body of Cu—Al—Mn-based shape-memory alloy according to the present invention is according to conditions for manufacturing a superelastic Cu—Al—Mn-based alloy material having stable good superelasticity and high resistance to cyclic deformation as described above and includes: form-rolling at least a portion of a material for the formed body to plastically shape the portion, while allowing the portion to have an A2-type crystal structure; and then heat-treating the portion to convert the A2-type crystal structure to an $L2_1$-type crystal structure and to form a screw portion having superelasticity. After the form rolling to form a screw portion, the portion is preferably heat-treated at a temperature of 80 to 300° C., while the heat treatment may be carried out at any temperature that allows the conversion to the $L2_1$-type structure. For example, the manufacturing method according to the present invention may include the steps described below.

Method of Manufacturing Rod Material Before Threading

Figure 4:
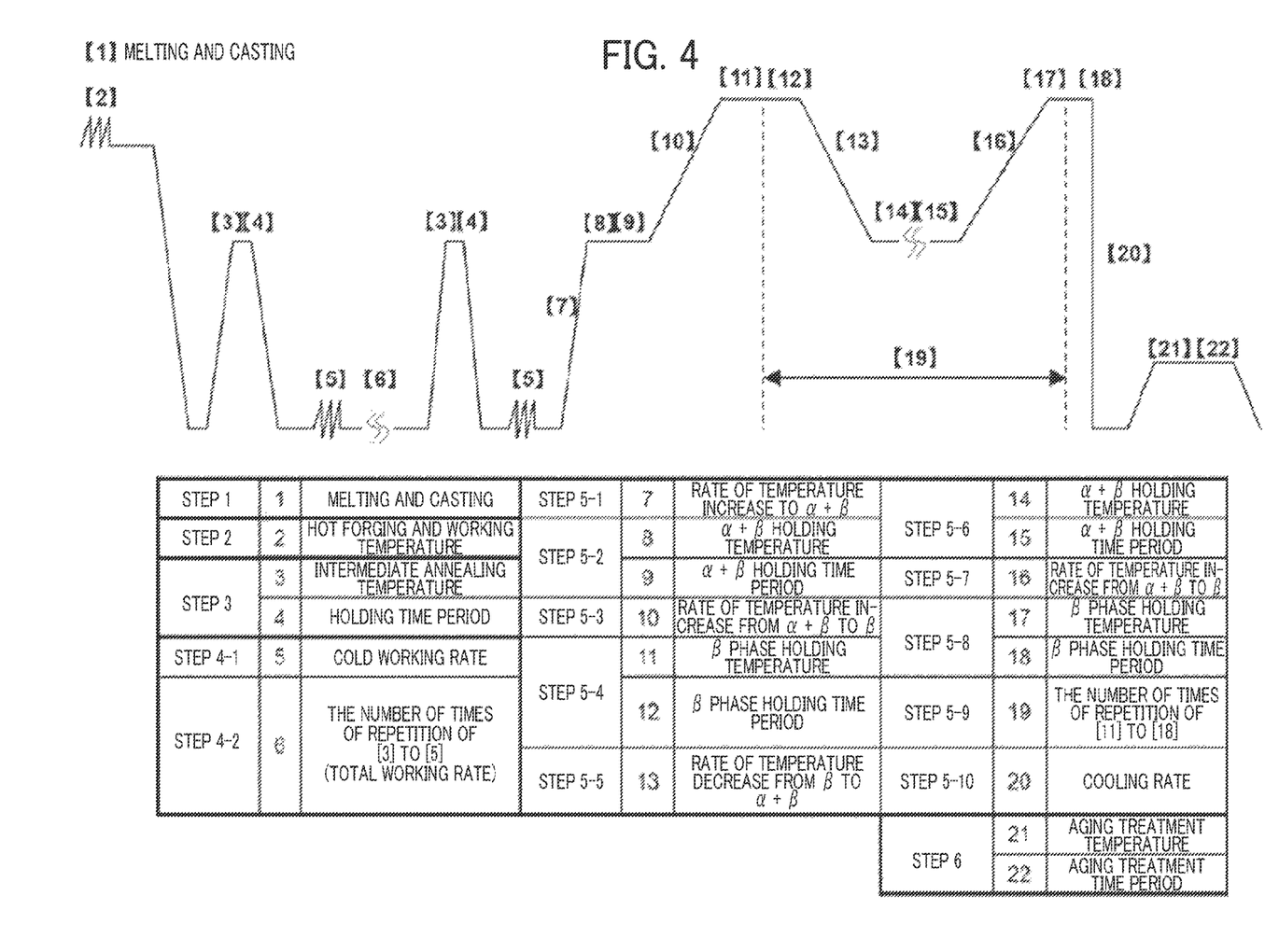
FIG. 4 is a schematic diagram showing exemplary conditions for each step of a method of manufacturing a shape-memory alloy according to the present invention.

Before threading, a process of manufacturing a Cu—Al—Mn-based alloy rod material (a material for the formed body) may mainly include, as shown in FIG. 4, melting and casting (step 1), hog forging and machining (step 2), intermediate annealing (step 3), cold working (step 4), and shape-memory heat treatment (step 5).

In the manufacturing process, specifically, the intermediate annealing (step 3) may include heat treatment at a temperature in the range of 400 to 680° C. [3], and the cold working (specifically cold rolling or cold drawing) (step 4-1) may include cold rolling at a rolling reduction of 30% or more or cold drawing at a rate of 30% or more [5]. Under such conditions, a Cu—Al—Mn-based alloy material having stable good superelasticity is successfully obtained. Moreover, the shape-memory heat treatment (steps 5-1 to 5-10) may include: controlling, in a specific low range of 0.1 to 20° C./minute, heating (step 5-3) from the (α+β) phase temperature regions [8] and [14] (400 to 650° C., preferably 450 to 550° C., depending on the alloy composition) respectively to the β single phase temperature regions [11] and [17] (typically 700° C. or more, preferably 750° C. or more, more preferably 900 to 950° C., depending on the alloy composition); and controlling the rate of temperature increase [10] [16] in a specific low range of 0.1 to 20° C./minute (in step 5-7). Furthermore, the cooling step (step 5-5) may include controlling, in a specific low range of 0.1 to 20° C./minute, the rate of temperature decrease [13] from the β single phase temperature region [11] to the (α+β) phase temperature region [14]. Furthermore, after the heating (step 5-3) from the (α+β) phase temperature region [8] to the β single phase temperature region [11], a process from step (5-4) to step (5-8) may be repeated at least one time, preferably at least four times (step 5-9). Such a process includes holding (step 5-4) the β single phase temperature region [11] for a specific period of time [12]; then cooling (step 5-5) at a rate of temperature decrease of 0.1 to 20° C./minute [13] from the single phase temperature region [11] to the (α+β) phase temperature region [14]; holding (step 5-6) the temperature region [14] for a specific period of time [15]; heating (step 5-7) at a rate of temperature increase [16] of 0.1 to 20° C./minute from the (α+β) phase temperature region [14] to the β single phase temperature region [17]; and holding (step 5-8) the temperature region [17] for a specific period of time [18]. The process is followed by final rapid cooling (step 5-10).

Preferably, the manufacturing process is as follows. According to an ordinary method, melting and casting (step 1) and hot working including hot rolling or hot forging (step 2) are performed, which is followed by intermediate annealing (step 3) at 400 to 680° C. [3] for 1 to 120 minutes [4] and then cold working (step 4-1) including cold rolling or drawing at a working rate of 30% or more [5]. In this process, the intermediate annealing (step 3) and the cold working (step 4-1) may be performed one time in this order or repeated two times or more (the number of times of repetitions [6]) in this order (step 4-2). Subsequently, the shape-memory heat treatment (steps 5-1 to 5-10) is performed.

The repetition (step 4-2) of the intermediate annealing (step 3) and the cold working (step 4-1) allows a more preferred mode of crystal orientation accumulation. The number [6] of times of the repetition of the intermediate annealing (step 3) and the cold working (step 4-1) may be one, preferably two or more, and more preferably three or more. As the number [6] of times of the repetition of the intermediate annealing (step 3) and the cold working (step 4-1) increase, the properties can improve.

The shape-memory heat treatment (steps 5-1 to 5-10) includes heating (step 5-3) at a rate of temperature increase [10] of 0.1 to 20° C./minute, preferably 0.1 to 10° C./minute, more preferably 0.1 to 3.3° C./minute, from the (α+β) phase temperature region [8] (e.g., 450° C.) to the β single phase temperature region [11] (e.g., 900° C.) (hereinafter referred to as gradual heating); holding (step 5-4) the β phase-holding temperature [11] for 5 to 480 minutes, preferably 10 to 360 minutes [12]; cooling (step 5-5) at a rate of temperature decrease [13] of 0.1 to 20° C./minute, preferably 0.1 to 10° C./minute, more preferably 0.1 to 3.3° C./minute, from the β single phase temperature region [11] (e.g., 900° C.) to the (α+β) phase temperature region [14] (e.g., 450° C.) (hereinafter referred to as gradual cooling); and holding (step 5-6) the (α+β) phase-holding temperature [14] for 20 to 480 minutes, preferably 30 to 360 minutes [15]. That is followed by heating (step 5-7) at the above rate of temperature increase [16] from the (α+β) phase-holding temperature [14] (e.g., 450° C.) to the β single phase-holding temperature [17] (e.g., 900° C.); and holding (step 5-8) the β single phase-holding temperature [17] for 5 to 480 minutes, preferably 10 to 360 minutes [18]. Such gradual cooling [13] (step 5-5) and gradual heating [16] (step 5-7) are repeated (step 5-9) at least one time, preferably at least four times (the number of times of repetition [19]). That is followed by rapid cooling (step 5-10), such as water cooling.

The temperature region in which the α+β single phase is reached (the (α+β) phase temperature region), specified according to the present invention, may be 400 to 650° C. and preferably 450 to 550° C. The temperature region in which the β single phase is reached (the β single phase temperature region) may be 700° C. or more, preferably 750° C. or more, and more preferably 900 to 950° C.

Method of Forming Screw Portion

After the structure-controlling heat treatment described above, the rod material (the material for the formed body) has an A2-type crystal structure. The rod material with an A2-type crystal structure is subjected to plastic working for forming a screw portion. To form a screw portion, the plastic working may be performed using any known general means for forming rolled threads, such as flat die form rolling or round die form rolling. In such form rolling, compressive stress is applied from the die to the structural material so that a screw portion with increased strength is formed. The form rolling may be performed under any conditions including temperature conditions. For example, the form rolling is preferably performed at temperatures of about 0 to about 80° C.

That is followed by aging heat treatment (step 6) at 80 to 300° C. [21] for 5 to 120 minutes [22] to form an $L2_1$-type crystal structure. If the aging treatment temperature [21] is too low, the β phase may be produced in an astable state, which may cause the martensitic transformation temperature to change over time during standing at room temperature. On the other hand, if the aging treatment temperature [21] is relatively high, bainite (metal structure) may precipitate, and if the aging treatment temperature [21] is too high, the α phase may precipitate. Especially, the precipitation of the α phase tends to significantly degrade the shape-memory properties or superelasticity.

Preferred Conditions for Each Step

The intermediate annealing (step 3) may be performed at 400 to 680° C. [3] for 1 to 120 minutes [4]. The intermediate annealing temperature [3] is preferably as low as possible, and preferably 400 to 550° C. The cold working (step 4-1) may be performed at a working rate of 30% or more [5]. In this regard, the working rate is the value defined by the following formula:

$$\text{Working rate (\%)} = \{(A_1 - A_2)/A_1\} \times 100$$

In this formula, $A_1$ is the area of the cross-section of the sample before the cold working (cold rolling or cold drawing), and $A_2$ is the area of the cross-section of the sample after the cold working.

The intermediate annealing (step 3) and the cold working (step 4-1) may be repeated two times or more at a total working rate [6] of 30% or more and more preferably 45% or more. The upper limit of the total working rate is typically, but not limited to, 95% or less.

In the shape-memory heat treatment (steps 5-1 to 5-10), first, step 5-1 may be performed, which includes heating the cold-worked product at a rate of temperature increase [7] (e.g., 30° C./minute) from room temperature to the (α+β) phase temperature region (e.g., 450° C.) [8]. Subsequently, the temperature may be held in the (α+β) phase temperature region [8] (e.g., 450° C.) for 2 to 120 minutes, preferably 10 to 120 minutes [9] (step 5-2). Subsequently, gradual heating (step 5-3) may be performed at a rate of temperature increase [10] of 0.1 to 20° C./minute, preferably 0.1 to 10° C./minute, more preferably 0.1 to 3.3° C./minute, from the (α+β) phase temperature region (e.g., 450° C.) [8] to the β single phase temperature region (e.g., 900° C.) [11]. Subsequently, the temperature may be held in the temperature region [11] for 5 to 480 minutes, preferably 10 to 360 minutes [12] (step 5-4). Subsequently, cooling (step 5-5) may be performed at a rate of temperature decrease [13] of 0.1 to 20° C./minute, preferably 0.1 to 10° C./minute, more preferably 0.1 to 3.3° C./minute, from the β single phase temperature region [11] (e.g., 900° C.) to the (α+β) phase temperature region [14] (e.g., 450° C.), and the temperature may be held in the temperature region [14] for 20 to 480 minutes, preferably 30 to 360 minutes [15] (step 5-6). Subsequently, heating (step 5-7) may be performed at a rate of gradual temperature increase [16] again from the (α+β) phase temperature region (e.g., 450° C.) [14] to the β single phase temperature region (e.g., 900° C.) [17], and the temperature may be held in the temperature region [17] for 5 to 480 minutes, preferably 10 to 360 minutes [18] (step 5-8). Such a process (steps 5-4 to step 5-8) (conditions [11] to [18]) may be repeated (step 5-9) at least one time, preferably at least four times [19].

The subsequent cooling (step 5-10) is generally rapid cooling at a rate of temperature decrease [20] of 30° C./second or more, preferably 100° C./second or more, and more preferably 1,000° C./second or more. The roll threading is followed by the aging heat treatment (step 6) at a temperature of 80 to 300° C. [21] for a period of time of 5 to 120 minutes [22], preferably at a temperature of 100 to 200° C. [21] for a period of time of 5 to 120 minutes [22].

It will be understood that the embodiments are described only by way of example for ease of the understanding of specific modes of the present invention, and are not intended to limit the present invention. It will also be understood that the present invention should be widely construed within the gist and scope of the invention recited in claims.

EXAMPLES

Hereinafter, the present invention will be described in more detail with reference to examples, which are not intended to limit the present invention.

In the examples and comparative examples shown below, materials for formed bodies were subjected to cutting or form rolling in order to check whether the materials are workable for the formation of screw portions with the same shape. The successfully worked screw products were evaluated for Vickers hardness, superelastic residual strain, resistance to fatigue (the number of times of tension cycles), and resistance to breaking (breaking elongation), and then it was determined whether any significant difference exists.

Evaluation Methods

The methods used for test and evaluation in examples and comparative examples are as follows.

(1) Sample for Evaluation

Samples to be evaluated were two types: formed bodies A and B. The formed body A has a screw portion formed by subjecting a one end portion of a 100 mm-long rod material to threading over a length of 25 mm. The formed body B has a screw portion formed by subjecting both end portions of a 200 mm-long rod material to threading over a length of 25 mm.

(2) Evaluation of Whether Threading is Possible or not (Gauge Evaluation)

Gauge evaluation was performed to evaluate whether threading is possible by form rolling or cutting. After threading, the external thread gauge inspection method according to JIS B 0251:2008 was performed using go and no-go thread ring gauges. The threaded product was evaluated as good (o) (the threading was successful) when the product was able to be screwed into the go thread ring gauge over the full thread length and not able to be screwed into the part of the no-go thread ring gauge within two threads. Otherwise, the product was evaluated as poor (x) (the threading was difficult).

(3) Measurement of Dimensions of Screw

The dimensions of the screw were measured as follows. The maximum diameter Dmax of the screw portion 1 was measured with a flat micrometer. The minimum diameter Dmin of the screw portion 1 was measured with a knife edge micrometer. The ratio of each of Dmax and Dmin to the diameter Dsh of the rod portion 2 was calculated. The dimensions of one end portion of the formed body A and both end portions of the shaped produce B (three portions in total) were measured and then averaged to determine the dimension value.

(4) Vickers Hardness

The hardness of the screw portion was measured as follows. The screw portion was cut into halves with a wet abrasive cutter with respect to the position of a plane containing the axis direction of the screw portion. The half was embedded into a resin in such a way the resulting cut surface could be polished. The cut surface was polished with a metal polishing machine and buff-finished with 0.2 μm alumina abrasive grains. The hardness of the finished surface was measured with a micro-Vickers hardness meter under a pressing load of 100 gf.

The hardness measurement method was carried out as follows according to JIS Z 2244:2009. The diamond indenter was pressed against the surface of the test piece and then released until the distance between the surface of the screw and the center of the formed dent (the intersection of the diagonals of the dent) reached 2.5 times or more the average of the diagonals of the dent. In each screw portion, the hardness of the surface portion was measured at 15 places in total, which included three places 0.15 mm away in the depth direction from the top $S_T$ of the thread $S_M$, the center of the inclined portion $S_{in}$ of the screw, and the bottom $S_B$ of the groove $S_V$ of the screw, respectively, in a cross-section containing the axis of the screw portion; and four places away at intervals of 0.16 mm in a direction perpendicular to the axis of the screw from each of the three places (three places×four places=12 places). The center of the inclined portion $S_{in}$ of the screw is the (Dmax/Dmin)/2 point on the surface of the inclined portion $S_{in}$ shown in FIG. 2. In each screw portion, the hardness of the central portion was measured at 10 places in total, which were at intervals of 0.16 mm along the axis of the screw portion in a 0.80 mm-wide region (portion) defined about the axis as the center and extending along the axis in a cross-section containing the axis. Hs was calculated as the average (average hardness) of all Vickers hardness values measured at the surface layer portion of the screw portion. Ho was calculated as the average of all Vickers hardness values measured at the central portion of the screw portion. The Hs/Ho ratio was calculated as the ratio of the average Vickers hardness of the screw surface layer portion to the average Vickers hardness of the central portion of the screw portion. In this regard, the average hardness values shown in Tables 4 to 7 are each the average of all Vickers hardness values measured at the screw surface layer portion.

(5) Superelastic Residual Strain Characteristic

The superelastic residual strain characteristic was evaluated as follows. The test piece (formed body B) was subjected to a tensile test which included screwing the test piece into a long nut with M14 both ends and a length of 50 mm; inserting the long nut into the chuck of a tensile tester; applying a load at a strain rate of 1%/min until the applied strain reached 5% and then reducing the load to zero while using a non-contact extensometer with an original gauge length of 40 mm. The test piece was evaluated as good when the residual strain was 0.5% or less at the point of time when the load was zero.

(6) Resistance to Fatigue (Tensile Cycle Test)

The resistance to fatigue was evaluated as follows. After the evaluation of the superelastic residual stress characteristic, the test piece (formed body B) was subjected to a tensile cycle test including 1,000 cycles of loading at a strain rate of 2°/min until the applied strain reached 5° and reducing the load to zero. As the number of cycles to breaking increases in the tensile cycle test, the test piece can withstand more repeated deformation cycles and more resist building collapse or component destruction and thus has higher resistance to fatigue. The test piece was evaluated as good when it did not break even after the 1,000 cycles in the tensile cycle test.

(7) Resistance to Breaking (Breaking Elongation)

The breaking elongation was determined as follows. After the tensile cycle test, the test piece (formed body B) was pulled at a strain rate of 1%/min to breaking at which the value of breaking elongation was determined using an extensometer. The fatigue resistance of the test piece was evaluated as good when a breaking elongation of 7% or more was achieved without breaking of the screw portion.

(8) Comprehensive Evaluation

Comprehensive evaluation was made as follows with respect to the successfully threaded products. The test piece was rated "A" when all of the three characteristics: the superelastic residual strain characteristic, the resistance to fatigue, and the resistance to breaking were good. The test piece was rated "B" when two of the three characteristics were good. The test piece was rated "C" when not more than one of the three characteristics was good.

Alloy Composition

Tables 1 to 3 show the composition of each of the alloys used for the materials for formed bodies products in the examples and comparative examples.

TABLE 1

| Alloy No. | Chemical composition (mass %) | | | | | | | | | | | | | | |
|---|---|---|---|---|---|---|---|---|---|---|---|---|---|---|---|
| | Al | Mn | Ni | Co | Fe | Ti | V | Cr | Si | Nb | Mo | W | Sn | Mg | P |
| 1 | 8.2 | 10.7 | — | — | — | — | — | — | — | — | — | — | — | — | — |
| 2 | 10.7 | 8.1 | — | — | — | — | — | — | — | — | — | — | — | — | — |
| 3 | 7.9 | 11.5 | — | — | — | — | — | — | — | — | — | — | — | — | — |
| 4 | 3.0 | 10.0 | — | — | — | — | — | — | — | — | — | — | — | — | — |
| 5 | 8.2 | 20.0 | — | — | — | — | — | — | — | — | — | — | — | — | — |
| 6 | 8.2 | 10.2 | 0.50 | — | — | — | — | — | — | — | — | — | — | — | — |
| 7 | 8.2 | 9.7 | — | 1.00 | — | — | — | — | — | — | — | — | — | — | — |
| 8 | 8.2 | 10.6 | — | — | 0.10 | — | — | — | — | — | — | — | — | — | — |
| 9 | 8.2 | 10.4 | — | — | — | 0.30 | — | — | — | — | — | — | — | — | — |
| 10 | 8.3 | 9.9 | — | — | — | — | 0.40 | — | — | — | — | — | — | — | — |

| Alloy No. | Chemical composition (mass %) | | | | | | | | | | Total content of optional additive elements | Cu |
|---|---|---|---|---|---|---|---|---|---|---|---|---|
| | Be | Sb | Cd | As | Zr | Zn | B | C | Ag | Ce | | |
| 1 | — | — | — | — | — | — | — | — | — | — | 0.00 | Balance |
| 2 | — | — | — | — | — | — | — | — | — | — | 0.00 | Balance |
| 3 | — | — | — | — | — | — | — | — | — | — | 0.00 | Balance |
| 4 | — | — | — | — | — | — | — | — | — | — | 0.00 | Balance |
| 5 | — | — | — | — | — | — | — | — | — | — | 0.00 | Balance |
| 6 | — | — | — | — | — | — | — | — | — | — | 0.50 | Balance |
| 7 | — | — | — | — | — | — | — | — | — | — | 1.00 | Balance |
| 8 | — | — | — | — | — | — | — | — | — | — | 0.10 | Balance |
| 9 | — | — | — | — | — | — | — | — | — | — | 0.30 | Balance |
| 10 | — | — | — | — | — | — | — | — | — | — | 0.40 | Balance |

(Note):
The mark "—" in the table indicates that the element is not added to the raw material.

TABLE 2

| Alloy No. | Chemical composition (mass %) | | | | | | | | | | | | | | |
|---|---|---|---|---|---|---|---|---|---|---|---|---|---|---|---|
| | Al | Mn | Ni | Co | Fe | Ti | V | Cr | Si | Nb | Mo | W | Sn | Mg | P |
| 11 | 8.1 | 10.08 | — | — | — | — | — | 0.62 | — | — | — | — | — | — | — |
| 12 | 8.2 | 10.6 | — | — | — | — | — | — | 0.12 | — | — | — | — | — | — |
| 13 | 8.3 | 10.6 | — | — | — | — | — | — | — | 0.22 | — | — | — | — | — |
| 14 | 8.1 | 10.0 | — | — | — | — | — | — | — | — | 0.80 | — | — | — | — |
| 15 | 8.2 | 9.7 | — | — | — | — | — | — | — | — | — | 1.00 | — | — | — |
| 16 | 8.2 | 10.6 | — | — | — | — | — | — | — | — | — | — | 0.05 | — | — |
| 17 | 8.2 | 10.5 | — | — | — | — | — | — | — | — | — | — | — | 0.43 | — |
| 18 | 8.2 | 10.0 | — | — | — | — | — | — | — | — | — | — | — | — | 0.70 |
| 19 | 8.2 | 10.1 | — | — | — | — | — | — | — | — | — | — | — | — | — |
| 20 | 8.2 | 10.2 | — | — | — | — | — | — | — | — | — | — | — | — | — |

| Alloy No. | Chemical composition (mass %) | | | | | | | | | | Total content of optional additive elements | Cu |
|---|---|---|---|---|---|---|---|---|---|---|---|---|
| | Be | Sb | Cd | As | Zr | Zn | B | C | Ag | Ce | | |
| 11 | — | — | — | — | — | — | — | — | — | — | 0.62 | Balance |
| 12 | — | — | — | — | — | — | — | — | — | — | 0.12 | Balance |
| 13 | — | — | — | — | — | — | — | — | — | — | 0.22 | Balance |
| 14 | — | — | — | — | — | — | — | — | — | — | 0.90 | Balance |
| 15 | — | — | — | — | — | — | — | — | — | — | 1.00 | Balance |
| 16 | — | — | — | — | — | — | — | — | — | — | 0.05 | Balance |

TABLE 2-continued

|    |      |      |   |   |   |   |   |   |   |   | 0.43 | Balance |
|----|------|------|---|---|---|---|---|---|---|---|------|---------|
| 17 | —    |      | — | — | — | — | — | — | — | — | 0.43 | Balance |
| 18 | —    |      | — | — | — | — | — | — | — | — | 0.70 | Balance |
| 19 | 0.65 | —    | — | — | — | — | — | — | — | — | 0.65 | Balance |
| 20 | —    | 0.51 | — | — | — | — | — | — | — | — | 0.51 | Balance |

(Note):
The mark "—" in the table indicates that the element is not added to the raw material.

TABLE 3

| | Chemical composition (mass %) | | | | | | | | | | | | | | |
|---|---|---|---|---|---|---|---|---|---|---|---|---|---|---|---|
| Alloy No. | Al | Mn | Ni | Co | Fe | Ti | V | Cr | Si | Nb | Mo | W | Sn | Mg | P |
| 21 | 8.2 | 10.6 | — | — | — | — | — | — | — | — | — | — | — | — | — |
| 22 | 8.2 | 10.6 | — | — | — | — | — | — | — | — | — | — | — | — | — |
| 23 | 8.4 | 10.4 | — | — | — | — | — | — | — | — | — | — | — | — | — |
| 24 | 8.1 | 10.8 | — | — | — | — | — | — | — | — | — | — | — | — | — |
| 25 | 8.3 | 9.8 | — | — | — | — | — | — | — | — | — | — | — | — | — |
| 26 | 8.0 | 9.8 | — | — | — | — | — | — | — | — | — | — | — | — | — |
| 27 | 8.2 | 10.6 | — | — | — | — | — | — | — | — | — | — | — | — | — |
| 28 | 8.4 | 10.6 | — | — | — | — | — | — | — | — | — | — | — | — | — |
| 29 | 7.5 | 9.0 | 1.00 | 0.01 | 0.15 | 3.00 | 1.20 | 0.12 | 1.40 | — | 0.13 | 0.12 | — | 1.30 | 0.95 |
| 30 | 10.0 | 6.0 | 5.30 | — | — | — | — | — | — | — | — | — | — | — | — |
| 31 | — | — | 56.0 | — | — | 44.0 | — | — | — | — | — | — | — | — | — |

| | Chemical composition (mass %) | | | | | | | | | | | |
|---|---|---|---|---|---|---|---|---|---|---|---|---|
| Alloy No. | Be | Sb | Cd | As | Zr | Zn | B | C | Ag | Ce | Total content of optional additive elements | Cu |
| 21 | — | — | 0.10 | — | — | — | — | — | — | — | 0.10 | Balance |
| 22 | — | — | — | 0.13 | — | — | — | — | — | — | 0.13 | Balance |
| 23 | — | — | — | — | 0.09 | — | — | — | — | — | 0.09 | Balance |
| 24 | — | — | — | — | — | 0.25 | — | — | — | — | 0.25 | Balance |
| 25 | — | — | — | — | — | — | 0.30 | — | — | — | 0.30 | Balance |
| 26 | — | — | — | — | — | — | — | 0.70 | — | — | 0.70 | Balance |
| 27 | — | — | — | — | — | — | — | — | 0.07 | — | 0.07 | Balance |
| 28 | — | — | — | — | — | — | — | — | — | 0.01 | 0.01 | Balance |
| 29 | — | 0.07 | 0.03 | — | 0.05 | 0.22 | 0.05 | 0.20 | — | — | 10.00 | Balance |
| 30 | — | — | — | — | — | — | — | — | — | — | 5.30 | Balance |
| 31 | — | — | — | — | — | — | — | — | — | — | — | — |

(Note):
The mark "—" in the table indicates that the element is not added to the raw material.

Examples 1 to 7

A Cu—Al—Mn-based alloy (Alloy No. 1 in Table 1) composed of 8.2 mass % of Al, 10.7 mass % of Mn, and the balance of Cu was used as the material for a formed body. The material was melted and cast in a high-frequency vacuum melting furnace and then subjected to hot forging at 800° C., hot rolling at 600° C., intermediate annealing at 520° C., and cold drawing at a cold working rate of 40% to form a rod with a diameter of 14 mm and a length of 300 mm. In an electric furnace, the rod was heated to 500° C. at a rate of temperature increase of 10° C./min, held at 500° C. for 1 hour, then heated to 900° C. at a rate of temperature increase of 1.0° C./min, then held at 900° C. for 10 minutes, then cooled to 500° C. at a rate of temperature decrease of 1.0° C./min, held at 500° C. for 1 hour, then heated to 900° C. at a rate of temperature increase of 1.0° C./min, held for 1 hour, and then rapidly cooled in water, so that a 300 mm-long rod with a single A2-type crystal structure was obtained. Subsequently, the rod with a diameter of 14 mm was subjected to lathe working and centerless polishing to form rods with different diameters in the range of 11.80 mm to 13.20 mm. Each rod was subjected to round die form rolling to form M14 threads with a pitch of 2 mm according to JIS B 0205 "General Purpose Metric Screw". Subsequently, the rod was subjected to aging heat treatment at 150° C. for a time period of 30 minutes so that a $L2_1$-type crystal structure exhibiting superelasticity was formed. As a result, a threaded rod of a Cu—Al—Mn-based shape-memory alloy according to the present invention was obtained. The resulting threaded rods were subjected to each of the evaluation procedures described above. Table 4 shows the results.

TABLE 4

| Example | Alloy No. | Crystal structure | Threading method | Temperature of heat treatment after threading (° C.) | Gauge evaluation for availability of threading | Rod diameter (Dsh) | Maximum thread diameter (Dmax)/Rod diameter (Dsh) | Minimum thread diameter (Dmin)/Rod diameter (Dsh) | Average hardness Hv | Screw surface layer portion hardness/central portion hardness (Hs/Hb) | Superelastic residual strain (%) | Number of repetitions of tensile cycle (times) | Breaking elongation (%) | Comprehensive evaluation |
|---|---|---|---|---|---|---|---|---|---|---|---|---|---|---|
| 1 | 1 | $L2_1$ | Form Rolling | 150 | o | 11.80 | 1.19 | 1.00 | 380 | 1.52 | 0.03 | 1000 | 6 | B |
| 2 | 1 | $L2_1$ | Form Rolling | 150 | o | 12.00 | 1.17 | 0.98 | 374 | 1.50 | 0.03 | 1000 | 63 | A |
| 3 | 1 | $L2_1$ | Form Rolling | 150 | o | 12.25 | 1.14 | 0.96 | 352 | 1.41 | 0.20 | 1000 | 52 | A |
| 4 | 1 | $L2_1$ | Form Rolling | 150 | o | 12.50 | 1.12 | 0.94 | 329 | 1.32 | 0.20 | 1000 | 78 | A |
| 5 | 1 | $L2_1$ | Form Rolling | 150 | o | 12.75 | 1.10 | 0.90 | 298 | 1.19 | 0.20 | 1000 | 35 | A |
| 6 | 1 | $L2_1$ | Form Rolling | 150 | o | 13.00 | 1.08 | 0.91 | 274 | 1.10 | 0.20 | 1000 | 67 | A |
| 7 | 1 | $L2_1$ | Form Rolling | 150 | o | 13.20 | 1.06 | 0.89 | 340 | 1.36 | 0.20 | 1000 | 6 | B |
| 8 | 1 | $L2_1$ | Form Rolling | 60 | o | 12.50 | 1.12 | 0.94 | 340 | 1.36 | 2.60 | 1000 | 55 | B |
| 9 | 1 | $L2_1$ | Form Rolling | 80 | o | 12.50 | 1.12 | 0.94 | 360 | 1.29 | 0.50 | 1000 | 61 | A |
| 10 | 1 | $L2_1$ | Form Rolling | 300 | o | 12.50 | 1.12 | 0.94 | 360 | 1.10 | 0.50 | 1000 | 8 | A |
| 11 | 1 | $L2_1$ | Form Rolling | 400 | o | 12.50 | 1.12 | 0.94 | 420 | 1.08 | 2.50 | 1000 | 7 | B |

The results in Table 4 show that threading is possible in Examples 1 to 7 and in particular, the products of Examples 2 to 6 have good superelasticity, high resistance to fatigue, and high resistance to breaking. In Example 1, the diameter of the rod to be subjected to form rolling is relatively small, which results in low workability during roll threading and low breaking elongation. In Example 7, the diameter of the rod to be subjected to form rolling is relatively large, which results in cracking found in a portion of the material during threading and results in low breaking elongation.

Examples 8 to 11

In Examples 8 to 11, the same manufacturing method as that in Example 4 was used except that the heat treatment temperature after the roll threading was changed to 60° C., 80° C., 300° C., and 400° C. and the aging heat treatment was performed for a period of time of 30 minutes. The resulting threaded rods were subjected to each of the evaluation procedures described above. Table 4 shows the results.

The results in Table 4 show that threading is possible in Examples 8 to 11 and in particular, the products of Examples 9 and 10 have good superelasticity, high resistance to fatigue, and high resistance to breaking. In Example 8, the heat treatment temperature after the roll threading was relatively low, so that the unordered A2-type structure poorly changed to the ordered $L2_1$-type structure, which resulted in insufficient superelasticity and large superelastic residual strain. In Example 11, the heat treatment temperature after the roll threading was relatively high, so that the Vickers hardness ratio (Hs/Ho ratio) was low and the bainite phase precipitated to lead to a poor result for superelastic residual strain.

Examples 12 to 40

In Examples 12 to 40, the same manufacturing method as that in Example 4 was used except that the content of Al and Mn and the type and content of the optional additive element in the Cu—Al—Mn-based alloy were changed as shown in Tables 1 to 3 (Alloy Nos. 2 to 30 in Tables 1 to 3). The resulting threaded rods were subjected to each of the evaluation procedures described above. Tables 5 and 6 show the results.

TABLE 5

| Example | Alloy No. | Crystal structure | Threading method | Temperature of heat treatment after threading (° C.) | Gauge evaluation for availability of threading | Rod diameter | Maximum thread diameter (Dmax)/ Rod diameter (Dsh) | Minimum thread diameter (Dmin)/ Rod diameter (Dsh) | Average hardness Hv | Screw surface layer portion hardness/ central portion hardness (Hs/Hb) | Superelastic residual strain (%) | Number of repetitions of tensile cycle (times) | Breaking elongation (%) | Comprehensive evaluation |
|---|---|---|---|---|---|---|---|---|---|---|---|---|---|---|
| 12 | 2 | $L2_1$ | Form Rolling | 150 | o | 12.50 | 1.12 | 0.94 | 337 | 1.35 | 0.155 | 1000 | 6 | B |
| 13 | 3 | $L2_1$ | Form Rolling | 150 | o | 12.50 | 1.12 | 0.94 | 326 | 1.31 | 0.19 | 1000 | 35 | A |
| 14 | 4 | $L2_1$ | Form Rolling | 150 | o | 12.50 | 1.12 | 0.94 | 345 | 1.35 | 0.10 | 1000 | 48 | A |
| 15 | 5 | $L2_1$ | Form Rolling | 150 | o | 12.50 | 1.12 | 0.94 | 343 | 1.37 | 0.18 | 1000 | 35 | A |
| 16 | 6 | $L2_1$ | Form Rolling | 150 | o | 12.50 | 1.12 | 0.94 | 342 | 1.37 | 0.07 | 1000 | 75 | A |
| 17 | 7 | $L2_1$ | Form Rolling | 150 | o | 12.50 | 1.12 | 0.94 | 349 | 1.40 | 0.06 | 1000 | 42 | A |
| 18 | 8 | $L2_1$ | Form Rolling | 150 | o | 12.50 | 1.12 | 0.94 | 341 | 1.36 | 0.14 | 1000 | 62 | A |
| 19 | 9 | $L2_1$ | Form Rolling | 150 | o | 12.50 | 1.12 | 0.94 | 334 | 1.34 | 0.03 | 1000 | 74 | A |
| 20 | 10 | $L2_1$ | Form Rolling | 150 | o | 12.50 | 1.12 | 0.94 | 343 | 1.37 | 0.06 | 1000 | 43 | A |
| 21 | 11 | $L2_1$ | Form Rolling | 150 | o | 12.50 | 1.12 | 0.94 | 336 | 1.34 | 0.02 | 1000 | 25 | A |
| 22 | 12 | $L2_1$ | Form Rolling | 150 | o | 12.50 | 1.12 | 0.94 | 345 | 1.38 | 0.06 | 1000 | 61 | A |
| 23 | 13 | $L2_1$ | Form Rolling | 150 | o | 12.50 | 1.12 | 0.94 | 335 | 1.34 | 0.04 | 1000 | 47 | A |
| 24 | 14 | $L2_1$ | Form Rolling | 150 | o | 12.50 | 1.12 | 0.94 | 345 | 1.38 | 0.08 | 1000 | 83 | A |
| 25 | 15 | $L2_1$ | Form Rolling | 150 | o | 12.50 | 1.12 | 0.94 | 342 | 1.37 | 0.07 | 1000 | 77 | A |
| 26 | 16 | $L2_1$ | Form Rolling | 150 | o | 12.50 | 1.12 | 0.94 | 330 | 1.32 | 0.04 | 1000 | 69 | A |
| 27 | 17 | $L2_1$ | Form Rolling | 150 | o | 12.50 | 1.12 | 0.94 | 337 | 1.35 | 0.05 | 1000 | 78 | A |
| 28 | 18 | $L2_1$ | Form Rolling | 150 | o | 12.50 | 1.12 | 0.94 | 344 | 1.38 | 0.06 | 1000 | 45 | A |

TABLE 6

| Example | Alloy No. | Crystal structure | Threading method | Temperature of heat treatment after threading (° C.) | Gauge evaluation for availability of threading | Rod diameter | Maximum thread diameter (Dmax)/ Rod diameter (Dsh) | Minimum thread diameter (Dmin)/ Rod diameter (Dsh) | Average hardness Hv | Screw surface layer portion hardness/ central portion hardness (Hs/Hb) | Superelastic residual strain (%) | Number of repetitions of tensile cycle (times) | Breaking elongation (%) | Comprehensive evaluation |
|---|---|---|---|---|---|---|---|---|---|---|---|---|---|---|
| 29 | 19 | $L2_1$ | Form Rolling | 150 | o | 12.50 | 1.12 | 0.94 | 342 | 1.37 | 0.12 | 1000 | 36 | A |
| 30 | 20 | $L2_1$ | Form Rolling | 150 | o | 12.50 | 1.12 | 0.94 | 345 | 1.38 | 0.08 | 1000 | 87 | A |
| 31 | 21 | $L2_1$ | Form Rolling | 150 | o | 12.50 | 1.12 | 0.94 | 337 | 1.35 | 0.03 | 1000 | 76 | A |
| 32 | 22 | $L2_1$ | Form Rolling | 150 | o | 12.50 | 1.12 | 0.94 | 343 | 1.37 | 0.11 | 1000 | 74 | A |

TABLE 6-continued

| Example | Alloy No. | Crystal structure | Threading method | Temperature of heat treatment after threading (° C.) | Gauge evaluation for availability of threading | Rod diameter | Maximum thread diameter (Dmax)/ Rod diameter (Dsh) | Minimum thread diameter (Dmin)/ Rod diameter (Dsh) | Average hardness Hv | Screw surface layer portion hardness/ central portion hardness (Hs/Hb) | Superelastic residual strain (%) | Number of repetitions of tensile cycle (times) | Breaking elongation (%) | Comprehensive evaluation |
|---|---|---|---|---|---|---|---|---|---|---|---|---|---|---|
| 33 | 23 | $L2_1$ | Form Rolling | 150 | o | 12.50 | 1.12 | 0.94 | 342 | 1.37 | 0.06 | 1000 | 69 | A |
| 34 | 24 | $L2_1$ | Form Rolling | 150 | o | 12.50 | 1.12 | 0.94 | 336 | 1.34 | 0.06 | 1000 | 77 | A |
| 35 | 25 | $L2_1$ | Form Rolling | 150 | o | 12.50 | 1.12 | 0.94 | 346 | 1.38 | 0.09 | 1000 | 52 | A |
| 36 | 26 | $L2_1$ | Form Rolling | 150 | o | 12.50 | 1.12 | 0.94 | 342 | 13.7 | 0.06 | 1000 | 49 | A |
| 37 | 27 | $L2_1$ | Form Rolling | 150 | o | 12.50 | 1.12 | 0.94 | 348 | 1.39 | 0.08 | 1000 | 68 | A |
| 38 | 28 | $L2_1$ | Form Rolling | 150 | o | 12.50 | 1.12 | 0.94 | 336 | 1.34 | 0.12 | 1000 | 42 | A |
| 39 | 29 | $L2_1$ | Form Rolling | 150 | o | 12.50 | 1.12 | 0.94 | 352 | 1.35 | 0.20 | 1000 | 35 | A |
| 40 | 30 | $L2_1$ | Form Rolling | 150 | o | 12.50 | 1.12 | 0.94 | 340 | 1.36 | 0.05 | 1000 | 45 | A |

The results in Tables 5 and 6 show that threading is possible in Examples 12 to 40. In particular, the products of Examples 13 to 40 have good superelasticity, high resistance to fatigue, and high resistance to breaking. In Example 12, the Al content is relatively high, which results in low resistance to breaking.

Comparative Examples 1 to 3

A Cu—Al—Mn-based alloy (Alloy No. 1 in Table 1) composed of 8.2 mass % of Al, 10.7 mass % of Mn, and the balance of Cu was used as the material for a formed body. The material was melted and cast in a high-frequency vacuum melting furnace and then subjected to hot forging at 800° C., hot rolling at 600° C., intermediate annealing at 520° C., and cold drawing at a cold working rate of 40% to form a rod with a diameter of 14 mm and a length of 300 mm. As in Example 1, in an electric furnace, the rod was heated to 500° C. at a rate of temperature increase of 10° C./min, held at 500° C. for 1 hour, then heated to 900° C. at a rate of temperature increase of 1.0° C./min, then held at 900° C. for 10 minutes, then cooled to 500° C. at a rate of temperature decrease of 1.0° C./min, held at 500° C. for 1 hour, then heated to 900° C. at a rate of temperature increase of 1.0° C./min, held for 1 hour, and then rapidly cooled in water, so that a 300 mm-long rod with a single A2-type crystal structure was obtained. Subsequently, the resulting rod with a diameter of 14 mm was subjected to lathe working and centerless polishing to form rods with diameters in the range of 12 mm to 13 mm. Each rod was subjected to lathe cutting to form M14 threads with a pitch of 2 mm according to JIS B 0205 "General Purpose Metric Screw". Subsequently, the rod was subjected to aging heat treatment at 150° C. for a time period of 30 minutes so that a $L2_1$-type crystal structure exhibiting superelasticity was formed. The resulting threaded rods were subjected to each of the evaluation procedures described above. Table 7 shows the results.

TABLE 7

| Example | Alloy No. | Crystal structure | Threading method | Temperature of heat treatment after threading (° C.) | Gauge evaluation for availability of threading | Rod diameter | Maximum thread diameter (Dmax)/ Rod diameter (Dsh) | Minimum thread diameter (Dmin)/ Rod diameter (Dsh) | Average hardness Hv | Screw surface layer portion hardness/ central portion hardness (Hs/Hb) | Superelastic residual strain (%) | Number of repetitions of tensile cycle (times) | Breaking elongation (%) | Comprehensive evaluation |
|---|---|---|---|---|---|---|---|---|---|---|---|---|---|---|
| 1 | 1 | $L2_1$ | Form Rolling | 150 | o | 12.00 | 1.17 | 0.98 | 253 | 1.01 | 0.02 | 400 | — | C |
| 2 | 1 | $L2_1$ | Form Rolling | 150 | o | 12.50 | 1.12 | 0.94 | 251 | 1.00 | 0.04 | 150 | — | C |
| 3 | 31 | $L2_1$ | Form Rolling | 150 | o | 13.00 | 1.08 | 0.91 | 255 | 1.02 | 0.03 | 20 | — | C |

TABLE 7-continued

| Example | Alloy No. | Crystal structure | Working method and availability of working | | | | Dimensional evaluation | | | Hardness | | Evaluation of material properties | | | |
|---|---|---|---|---|---|---|---|---|---|---|---|---|---|---|---|
| | | | Threading method | Temperature of heat treatment after threading (° C.) | Gauge evaluation for availability of threading | Rod diameter | Maximum thread diameter (Dmax)/ Rod diameter (Dsh) | Minimum thread diameter (Dmin)/ Rod diameter (Dsh) | Average hardness Hv | Screw surface layer portion hardness/ central portion hardness (Hs/Hb) | Superelastic residual strain (%) | Number of repetitions of tensile cycle (times) | Breaking elongation (%) | Comprehensive evaluation |
| 4 | 31 | — | Form Rolling | 500 | x | 12.00 | 1.17 | 0.98 | — | — | — | — | — | C |
| 5 | 31 | — | Form Rolling | 500 | x | 12.50 | 1.12 | 0.94 | — | — | — | — | — | C |
| 6 | 31 | — | Form Rolling | 500 | x | 13.00 | 1.08 | 0.91 | — | — | — | — | — | C |
| 7 | 31 | — | Form Rolling | 500 | x | 12.50 | — | — | — | — | — | — | — | C |
| 8 | 31 | — | Cutting | 500 | o | 12.00 | 1.17 | 0.90 | 389 | 1.02 | 0.15 | 400 | — | C |
| 9 | 31 | — | Cutting | 500 | o | 12.50 | 1.12 | 0.94 | 385 | 0.97 | 0.20 | 150 | — | C |
| 10 | 31 | — | Cutting | 500 | o | 13.00 | 1.08 | 0.91 | 393 | 0.98 | 0.19 | 20 | — | C |

(Note):
The mark "—" in the table indicates that the step for comparison is not performed.

The results of Comparative Examples 1 to 3 in Table 7 show that, when cutting work is carried out, the resistance to fatigue decreases with increasing rod diameter, and the resulting properties are insufficient.

Comparative Examples 4 to 6

A Ni—Ti shape-memory alloy (Alloy No. 31 in Table 3) was used in Comparative Examples 4 to 6. Among the shape-memory alloys, a material composed of 56.0 mass % of Ni and 44.0 mass % of Ti (superelastic composition) was melted and cast in a high-frequency vacuum melting furnace and then subjected to hot forging at 900° C., hot rolling at 900° C., intermediate annealing at 700° C., cold drawing at a cold working rate of 30° to form a rod with a diameter of 14 mm and a length of 300 mm, and then subjected to a straightening machine. As a result, four rods with linearity were formed. Three of the four rods were restrained using a linear shape-maintaining jig, heat-treated at 700° C. for 60 minutes, and then quenched in water. After the quenching at 700° C., the resulting rod with a diameter of 14 mm was worked with a lathe to a diameter of 12 to 13 mm and then cut into a 100 mm-long piece and a 200 mm-long piece. A one end portion of the worked 100 mm-long rod was subjected to round die form rolling to form M14 threads with a pitch of 2 mm according to JIS B 0205 "General Purpose Metric Screw". Both end portions of the other 200 mm-long rod was subjected to round die form rolling over a length of 25 mm to form M14 threads with a pitch of 2 mm according to JIS B 0205 "General Purpose Metric Screw". Subsequently, the rods were heat-treated at 300° C. for a period of time of 30 minutes and then subjected to aging heat treatment for precipitating $Ti_3Ni_4$ to form a structure exhibiting superelasticity.

The results of Comparative Examples 4 to 6 in Table 7 show that the pre-annealing made it possible to shape the Ni—Ti superelastic material by form rolling, but the heat treatment for making the material superelastic restored the shape, so that it was not possible to form satisfactory threads fulfilling the gauze evaluation requirements (for precision). As shown above, it was not possible to form screw portions with the same shape and to form threads. Therefore, the evaluation was not carried out for hardness, superelastic residual strain characteristic, resistance to fatigue, and resistance to breaking.

Comparative Example 7

Comparative Example 7 was the same as Comparative Example 4 except that the rod with a diameter of 14 mm was drawn to a diameter of 12.5 mm without quenching heat treatment at 700° C. Subsequently, according to the process in Comparative Example 4, the rod was subjected to form rolling and heat treatment for recrystallization to form a structure exhibiting superelasticity. In Example 7, heat treatment of a cold-worked structure-containing material was attempted in the most typical process for producing a Ni—Ti superelastic material, but as a result, the form rolling die and the material cracked during the form rolling, which made it impossible to form threads by form rolling. As shown above, it was not possible to form screw portions with the same shape and to form threads. Therefore, the evaluation was not carried out for hardness, superelastic residual strain characteristic, resistance to fatigue, and resistance to breaking.

Comparative Examples 8 to 10

A Ni—Ti shape-memory alloy (Alloy No. 31 in Table 3) was used in Comparative Examples 8 to 10. Among the shape-memory alloys, a material composed of 56.0 mass % of Ni and 44.0 mass % of Ti (superelastic composition) was melted and cast in a high-frequency vacuum melting furnace and then subjected to hot forging at 900° C., hot rolling at 900° C., intermediate annealing at 700° C., cold drawing at a cold working rate of 30% to form a rod with a diameter of 14 mm and a length of 300 mm, and then subjected to a straightening machine. As a result, three rods with linearity and the B2 crystal structure were formed. Each rod with a diameter of 14 mm was worked with a lathe to a diameter of 12 to 13 mm. Both end portions of the worked rod were then cut over a length of 25 mm with a lathe to form M14 thread with a pitch of 2 mm according to JIS B 0205 "General Purpose Metric Screw". Subsequently, the rod was heat-treated at 500° C. for a period of time of 30 minutes and then subjected to water cooling. The resulting threaded rods were able to be evaluated by some of the evaluation procedures described above. Table 7 shows the results. The results in Table 7 show that the products of Comparative Examples 8 to 10 with a larger diameter have lower resistance to fatigue and do not have satisfactory properties.

EXPLANATION OF REFERENCE NUMERALS

1: Screw portion
2: Rod portion
10: (Cu—Al—Mn-based shape-memory alloy) formed body
O: Axis of screw portion
Dsh: Diameter
Dmax: Maximum thread diameter
Dmin: Minimum thread diameter

The invention claimed is:

1. A formed body, comprising:
Cu—Al—Mn-based shape-memory alloy comprising a screw portion,
wherein the screw portion is a form-rolled portions,
wherein the screw portion has an Hs/Ho ratio of 1.1 or more when measured in a cross section including an axis of the screw portion for Hs and Ho,
wherein Hs is an average Vickers hardness of a surface layer portion of the screw portion, and Ho is an average Vickers hardness of a central portion of the screw portion.

2. The formed body of claim 1, further comprising:
a rod portion extending from at least one end of the screw portion,
wherein the body has a Dmax/Dsh ratio of 1.17 or less,
wherein Dmax is a maximum diameter of the screw portion, and Dsh is a diameter of the rod portion.

3. The formed body of claim 2, having a wherein the Dmin/Dsh ratio is 0.9 or more.

4. The formed body of claim 1, wherein the Cu—Al—Mn-based shape-memory alloy has a composition comprising 3.0 to 10.0 mass % of Al, 5.0 to 20.0 mass % of Mn, with the balance being Cu and inevitable impurities, and one or more optional additive elements selected from the group consisting of Ni, Co, Fe, Ti, V, Cr, Si, Nb, Mo, W, Sn, Mg, P, Be, Sb, Cd, As, Zr, Zn, B, C, Ag, and a misch metal,
wherein the optional additive elements have a total content of 0.000 to 10.000 mass %.

5. The formed body of claim 1, wherein the Cu—Al—Mn-based shape-memory alloy has an $L2_{1\text{-}type}$ crystal structure.

6. The formed body of claim 1, which does not break when undergoing a tensile cycle test including 1,000 cycles that repeats loading with a tensile strain of 5% and unloading.

7. The formed body of claim 1, having a breaking elongation of 7% or more until breaking by tensioning in a tensile test.

8. The formed body of claim 1, wherein the Cu—Al—Mn-based shape-memory alloy has a composition comprising
Cu,
3.0 to 10.0 mass % of Al,
5.0 to 20.0 mass % of Mn, and
0.000 to 10.000 mass %, in total, of at least one additive element selected from the group consisting of Ni, Co, Fe, Ti, V, Cr, Si, Nb, Mo, W, Sn, Mg, P, Be, Sb, Cd, As, Zr, Zn, B, C, Ag, and a misch metal.

9. A formed body, comprising:
Cu—Al—Mn-based shape-memory alloy comprising a screw portion,
wherein the screw portion has an Hs/Ho ratio of 1.1 or more when measured in a cross section including an axis of the screw portion for Hs and Ho,
wherein Hs is an average Vickers hardness of a surface layer portion of the screw portion, and Ho is an average Vickers hardness of a central portion of the screw portion.

10. The formed body of claim 9, further comprising:
a rod portion extending from at least one end of the screw portion,
wherein the formed body has a Dmax/Dsh ratio of 1.17 or less,
Dmax is a maximum diameter of the screw portion, and Dsh is a diameter of the rod portion.

11. The formed body of claim 10, wherein the Dmin/Dsh ratio is 0.9 or more.

12. The formed body of claim 9, wherein the Cu—Al—Mn-based shape-memory alloy has a composition comprising 3.0 to 10.0 mass % of Al, 5.0 to 20.0 mass % of Mn, with the balance being Cu and inevitable impurities, and one or more optional additive elements selected from the group consisting of Ni, Co, Fe, Ti, V, Cr, Si, Nb, Mo, W, Sn, Mg, P, Be, Sb, Cd, As, Zr, Zn, B, C, Ag, and a misch metal,
wherein the optional additive elements have a total content of 0.000 to 10.000 mass %.

13. The formed body of claim 9, wherein the Cu—Al—Mn-based shape-memory alloy has an L21-type crystal structure.

14. The formed body of claim 9, wherein the formed body has a which does not break when undergoing a tensile cycle test including 1,000 cycles that repeats loading with a tensile strain of 5% and unloading.

15. The formed body of claim 9, wherein the formed body having a breaking elongation of 7% or more until breaking by tensioning in a tensile test.

16. The formed body of claim 9, wherein the Cu—Al—Mn-based shape-memory alloy has a composition comprising
Cu,
3.0 to 10.0 mass % of Al,
5.0 to 20.0 mass % of Mn, and
0.000 to 10.000 mass %, in total, of at least one additive element selected from the group consisting of Ni, Co, Fe, Ti, V, Cr, Si, Nb, Mo, W, Sn, Mg, P, Be, Sb, Cd, As, Zr, Zn, B, C, Ag, and a misch metal.

17. A method of manufacturing a formed body of Cu—Al—Mn-based shape-memory alloy comprising a screw portion, the method comprising:
forming a screw portion having superelasticity by plastically working at least a portion of a raw material for the formed body with form-rolling in a state that a crystal structure is an A2-type structure, to obtain a formed raw material; and then,
heat treating the formed raw material so as to convert an A2-type crystal structure in the formed raw material into an $L2_{1\text{-}type}$ crystal structure.

18. The method of claim 17, wherein the heat treating is performed at a temperature in a range of from 80° C. to 300° C.

* * * * *